(12) United States Patent
Lee

(10) Patent No.: US 7,694,919 B2
(45) Date of Patent: Apr. 13, 2010

(54) STAND FOR DISPLAY DEVICE

(75) Inventor: Jin Bum Lee, Goomi-si (KR)

(73) Assignee: LG Electronics Inc., Seoul (KR)

( * ) Notice: Subject to any disclaimer, the term of this patent is extended or adjusted under 35 U.S.C. 154(b) by 670 days.

(21) Appl. No.: 11/486,032

(22) Filed: Jul. 14, 2006

(65) Prior Publication Data

US 2007/0194182 A1 Aug. 23, 2007

(30) Foreign Application Priority Data

Feb. 17, 2006 (KR) .................. 10-2006-0015875

(51) Int. Cl.
*E04G 3/00* (2006.01)
*G06F 1/16* (2006.01)

(52) U.S. Cl. .................. 248/123.11; 248/125.8; 248/286.1; 248/917; 361/679.06; 361/681

(58) Field of Classification Search .......... 248/125.7, 248/125.8, 157, 123.11, 274.1, 276.1, 917–920, 248/125.9, 286.1, 291.1, 295.1, 292.13; 361/681, 361/683, 679.01, 679.02, 679.06
See application file for complete search history.

(56) References Cited

U.S. PATENT DOCUMENTS

| 6,712,321 | B1 * | 3/2004 | Su et al. | 248/123.11 |
|---|---|---|---|---|
| 6,874,743 | B2 * | 4/2005 | Watanabe et al. | 248/276.1 |
| 7,036,787 | B1 * | 5/2006 | Lin | 248/676 |
| 7,124,984 | B2 * | 10/2006 | Yokouchi et al. | 248/125.8 |
| 7,177,144 | B2 * | 2/2007 | Ha et al. | 361/681 |
| 7,193,843 | B2 * | 3/2007 | Hsu | 361/681 |
| 7,336,478 | B2 * | 2/2008 | Jang | 361/679.27 |
| 7,413,150 | B1 * | 8/2008 | Hsu | 248/123.11 |
| 7,431,254 | B2 * | 10/2008 | Cheng | 248/292.12 |
| 7,497,410 | B2 * | 3/2009 | Lee | 248/398 |
| 7,517,029 | B2 * | 4/2009 | Cvek | 312/196 |
| 2003/0075649 | A1 * | 4/2003 | Jeong et al. | 248/157 |
| 2004/0084588 | A1 * | 5/2004 | Liu et al. | 248/291.1 |
| 2005/0002159 | A1 | 1/2005 | Jeong | 361/683 |
| 2005/0247832 | A1 | 11/2005 | Cho et al. | 248/133 |
| 2006/0000955 | A1 | 1/2006 | Cvek | 248/161 |
| 2006/0000956 | A1 * | 1/2006 | Cvek | 248/161 |
| 2006/0231699 | A1 * | 10/2006 | Yau et al. | 248/176.1 |

FOREIGN PATENT DOCUMENTS

JP 11-316556 11/1999

OTHER PUBLICATIONS

European Search Report dated Sep. 8, 2008.

\* cited by examiner

*Primary Examiner*—Amy J Sterling
*Assistant Examiner*—Tan Le
(74) *Attorney, Agent, or Firm*—KED & Associates, LLP

(57) ABSTRACT

An improved stand for a display device that allows reliable and multi-faceted adjusting of the display device is provided. The stand includes a base, a slide housing, a hinge, a fixing unit, and a hinge unit. The slide housing is fixed to the base at an end thereof and extends upward from the base. The hinge connecting unit is guided to move along an extending direction of the slide housing. The fixing unit connects an upper end of the hinge connecting unit to a display device. The hinge unit is disposed below the hinge connecting unit to allow the hinge connecting unit and the display device to pivot.

17 Claims, 13 Drawing Sheets

STAND FOR DISPLAY DEVICE

BACKGROUND OF THE INVENTION

1. Field of the Invention

The present invention relates to a stand for a display device, and more particularly, to a stand for a display device that allows for convenient height and tilt adjustment of its display device.

2. Description of the Related Art

A display device according to the related art uses a stand to rest on a flat surface. In order to support the display device on the flat surface, the device has a stand with a structure that allows the display to be adjusted and moved up and down to offer convenience to a user. Thus, when using the display, the user can move the display up or down to adjust the screen to a desired height, depending on the user's requirements.

Display devices according to the related art employ a sliding assembly that adjusts the height of the display by sliding up or down on the stand. However, the distance between the user and the display device, the tilting angle of the display device, and its height cannot be adjusted simultaneously.

Another type of display device stand according to the related art uses a four bar link to adjust the tilt of the display device. However, while this configuration is capable of easily adjusting the tilt of the display device, it cannot conveniently adjust the height of the display device due to the limits of the stand.

In the related art, a stand for a display device does not allow simultaneous height, tilt, and distance adjustments (to a user) of a display device. Also, a display device cannot be positioned at a substantially elevated height.

SUMMARY OF THE INVENTION

Accordingly, the present invention is directed to a stand for a display device that substantially obviates one or more problems due to limitations and disadvantages of the related art.

An object of the present invention is to provide a stand for a display device that can simultaneously adjust the height, tilt, and distance of the display device, enabling convenient use of the display device by a user.

Another object of the present invention is to provide a stand for a display device that allows more convenient adjusting of the stand through the use of a dual hinge system with a four bar link.

A further object of the present invention is to provide a stand for a display device that has multiple ranges of movement allowing the height, tilt, and distance of the display device to be adjusted, to increase the level of convenience for a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for a display device including: a base; a slide housing fixed to the base at an end thereof and extending upward from the base; a hinge connecting unit guided to move along an extending direction of the slide housing; a fixing unit connecting an upper end of the hinge connecting unit to a display device; and a hinge unit disposed below the hinge connecting unit, for allowing the hinge connecting unit and the display device to pivot.

In another aspect of the present invention, there is provided a stand for a display device including: a base; a slide housing fixed to the base at an end thereof and extending-from the base; a hinge connecting unit guided to move along an extending direction of the slide housing and including a hinge unit on either end thereof; a guided unit fixed to a lower end of the hinge connecting unit; a plate spring disposed inside the slide housing for being pressed upon by the guided unit and expanding; and a rear fixing unit fixed between an upper end of the hinge connecting unit and a rear of the display device.

In a further aspect of the present invention, there is provided a stand for a display device including: a base; a slide housing fixed to the base at an end thereof and extending in one direction from the base; a hinge connecting unit moving in a straight line along an extending direction of the slide housing; a display device pivotably connected to a top of the hinge connecting unit through a hinge; and a hinge unit provided below the hinge connecting unit, for allowing the hinge connecting unit to pivot with respect to the slide housing when the hinge connecting unit is extruded from the slide housing.

The stand for a display device according to the present invention provides convenience to a user using the display device by allowing him/her to simultaneously adjust the height, tilt, and distance of the display device according to his/her preferences. Also, by allowing the position of the display device to be changed in various modes, a user can adjust the display device according to his/her wishes and tastes, to thus offer a higher level of convenience to the user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
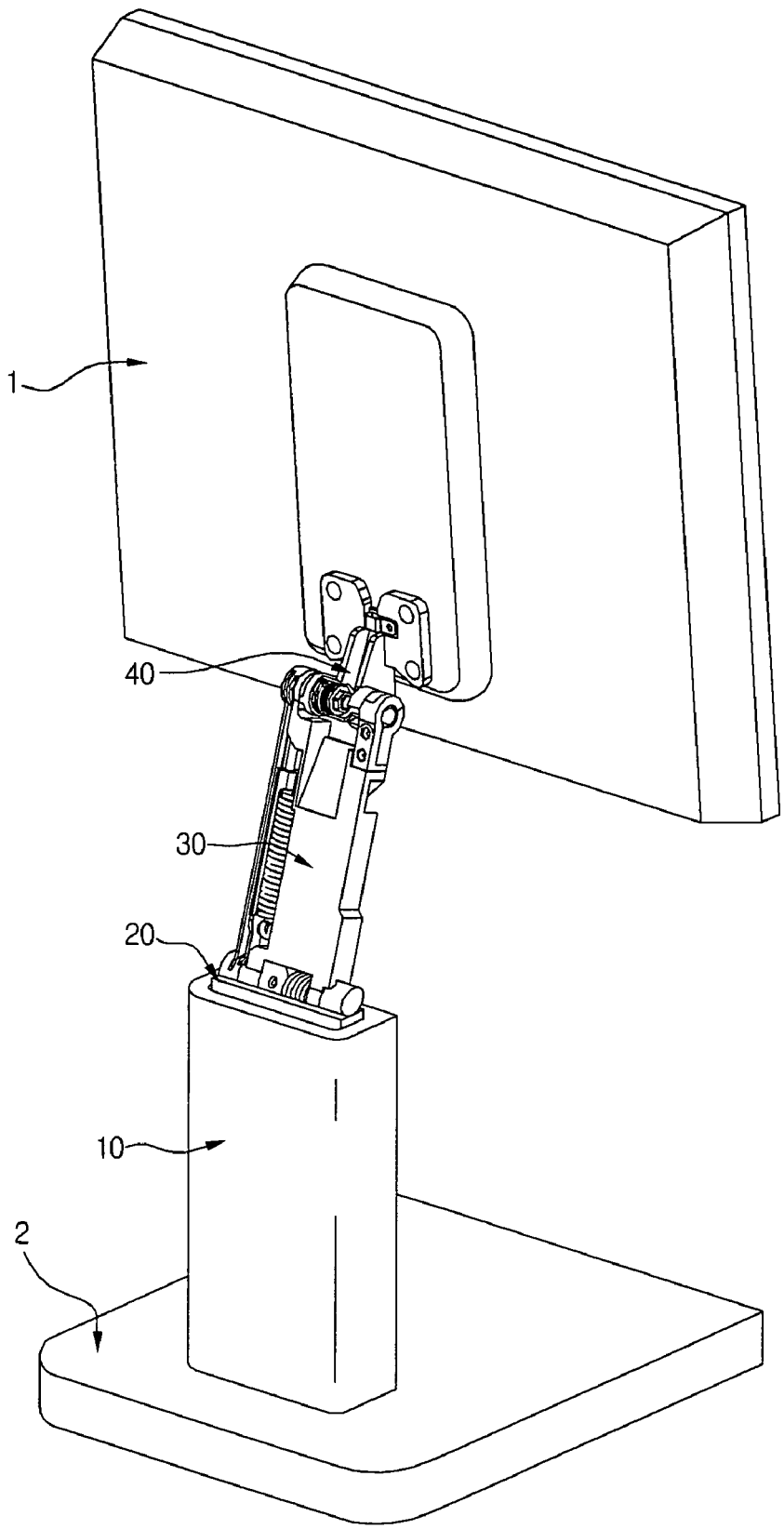
FIG. 1 is a perspective view of a stand for a display device according to present invention showing a hinge connecting unit extruding from a slide housing.
Figure 2:
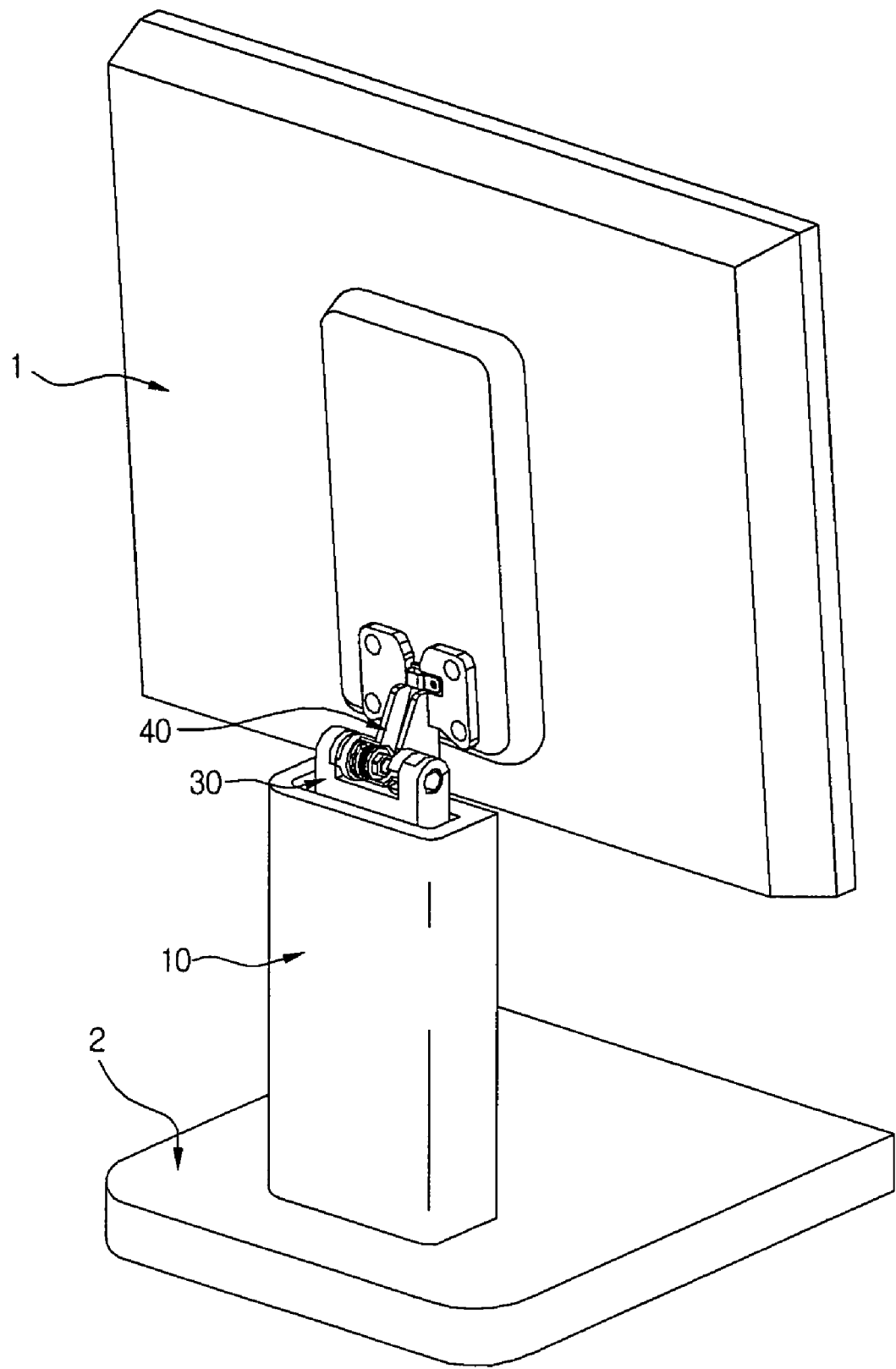
FIG. 2 is a perspective view of a stand for a display device according to present invention showing a hinge connecting unit inserted in a slide housing.

FIG. 1 is a perspective view of a stand for a display device according to present invention showing a hinge connecting unit extruding from a slide housing, and FIG. 2 is a perspective view of a stand for a display device according to present invention showing a hinge connecting unit inserted in a slide housing.

Referring to FIGS. 1 and 2, the stand for the display device according to the present invention includes a base 2 resting on a horizontal surface for supporting the display device 1, a slide housing 10 having one end fixed on the base 2 and a guiding member for moving the display device in a vertical direction with respect to the horizontal surface, and a hinge connecting unit 30 for moving in a vertical direction within the slide housing 10.

The lower end of the hinge connecting unit 30 is connected to a guided unit 20 that moves vertically within the slide housing 10, and its upper end is coupled to a rear fixing unit 40 for supporting the display device.

In the above-structured stand for a display device, the hinge connecting unit 30 is fixed to a pivoting guided unit 20 that is guided along a guiding member within the slide housing 10, and moves in upward and downward directions by means of the guiding of the slide housing 10, in order to freely adjust the screen of the display device to a height desired by a user.

Also, in the above-structured stand for a display device, the hinge connecting unit 30 couples through a hinge to the rear fixing unit 40 in order to support the display device at one end, and the other end of the hinge connecting unit 30 is pivotably connected to the guided unit 20 along the guiding member of the slide housing 10, so that a user of the display device can freely adjust the tilt angle and distance between the user and the screen.

In this structure, when the hinge connecting unit 30 extrudes out from the slide housing 10, the respective hinges formed on the upper and lower parts of the hinge connecting unit 30 allow two degrees-of-freedom of movements. When the hinge connecting unit 30 is inserted into the slide housing 10, the hinge formed on the upper part of the hinge connecting unit 30 has one degree-of freedom of movement. Through these degrees-of-freedom of movement, the operation mode of display device that is possible will be described below.

Next, a detailed description of the components of the stand for a display device according to the present invention will be given.

Figure 3:
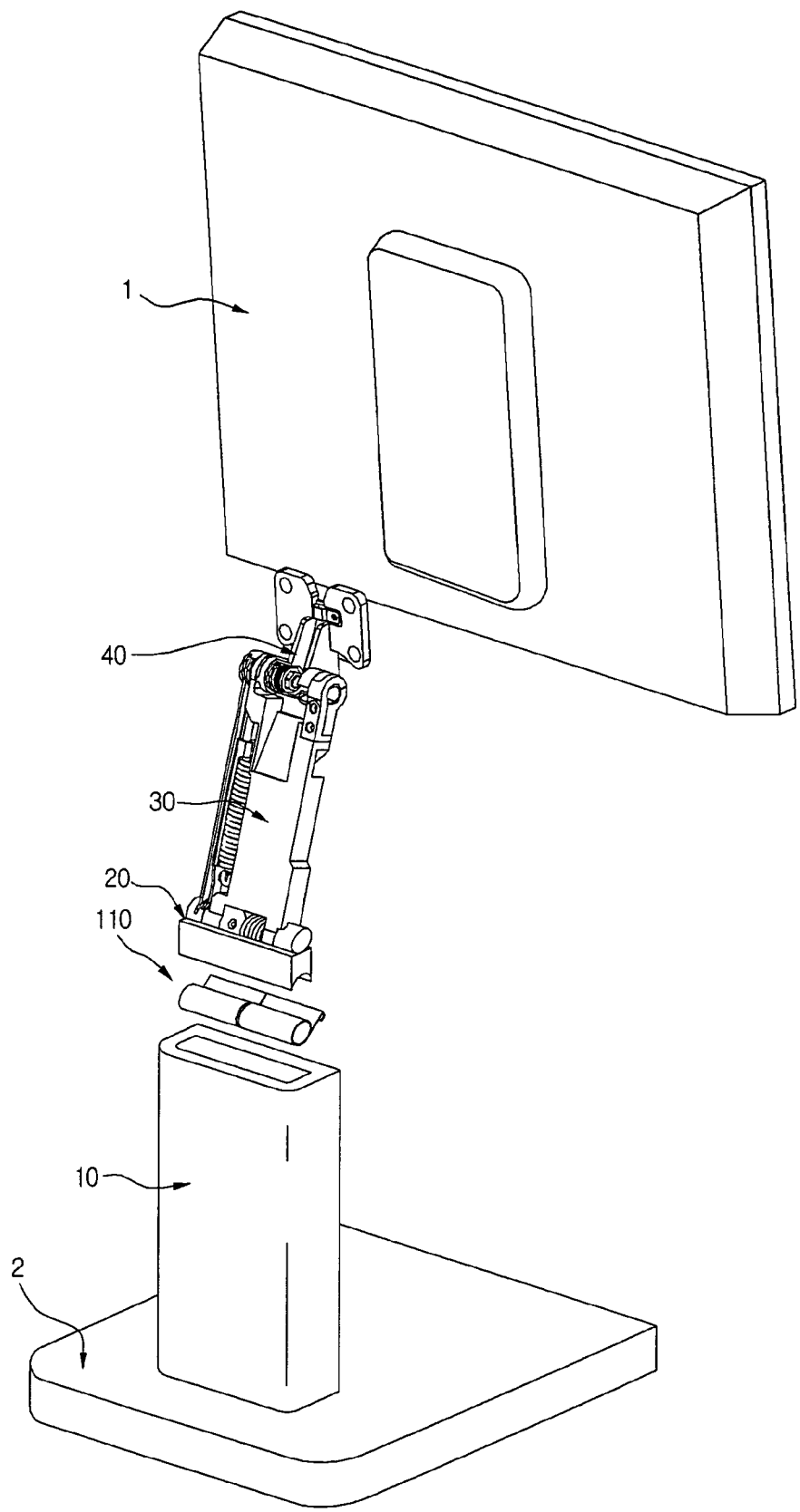
FIG. 3 is a schematic exploded perspective view of a display device according to the present invention.

FIG. 3 is a schematic exploded perspective view of a display device according to the present invention.

Referring to FIG. 3, the base 2 of the display device according to the present invention has a wide surface area in order to securely support the display device 1 on a horizontal surface. The base 2 may be formed as a rectangular or discoid plate, may have an empty inner portion, and may be formed in a wide variety of designs.

A slide housing 10, forming a guiding member within for moving the display device vertically, is installed on top of the base 2. The slide housing 10 has a body that may be formed in a hollow cylindrical or multi-sided column. The body has the guiding member formed within that guides a vertical movement of the guided unit 20 coupled to the bottom of the hinge connecting unit 30, so that the position of the display device 1 may be adjusted vertically.

Furthermore, the hinge connecting unit 30 is coupled to the guided unit 20 at a bottom thereof and moves vertically together with the guided unit 20 along the inside of the slide housing 10, due to the guided unit 20 moving vertically along a guiding member formed in the inner surface of the slide housing 10.

When the guided unit 20 moves to the highest end in the slide housing 10, the distance between the display device and a user may be freely adjusted due to the hinge connecting unit 30 being connected to the guided unit 20 via a hinge.

Because the upper end of the hinge connecting unit 30 is coupled to the rear fixing unit 40 for supporting the display device through a hinge (that is a pivotal point), the angle at which the screen is viewed and the distance between the screen and a user may be freely adjusted.

Also, the rear fixing unit 40 is interposed between the rear side of the display device and the hinge connecting unit 30 with a predetermined distance, so that the display device may be conveniently adjusted, when the hinge connecting unit 30 is inserted inside the slide housing 10.

A more detailed description of each part according to the present invention will now be given with reference to the diagrams.

Figure 4:
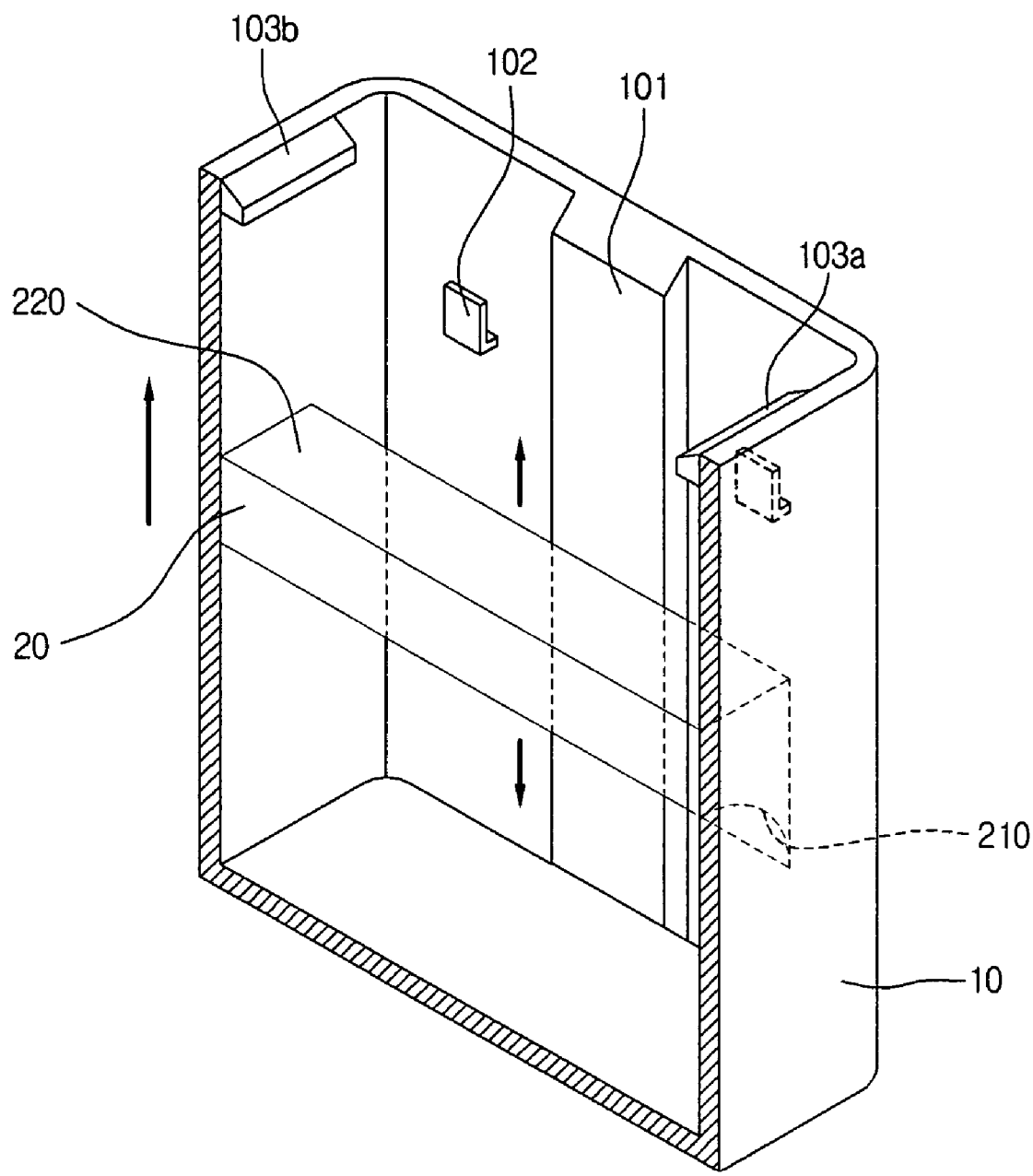
FIG. 4 is cutaway perspective view of a slide housing for illustrating a stand for a display device according to an embodiment of the present invention.
Figure 5:
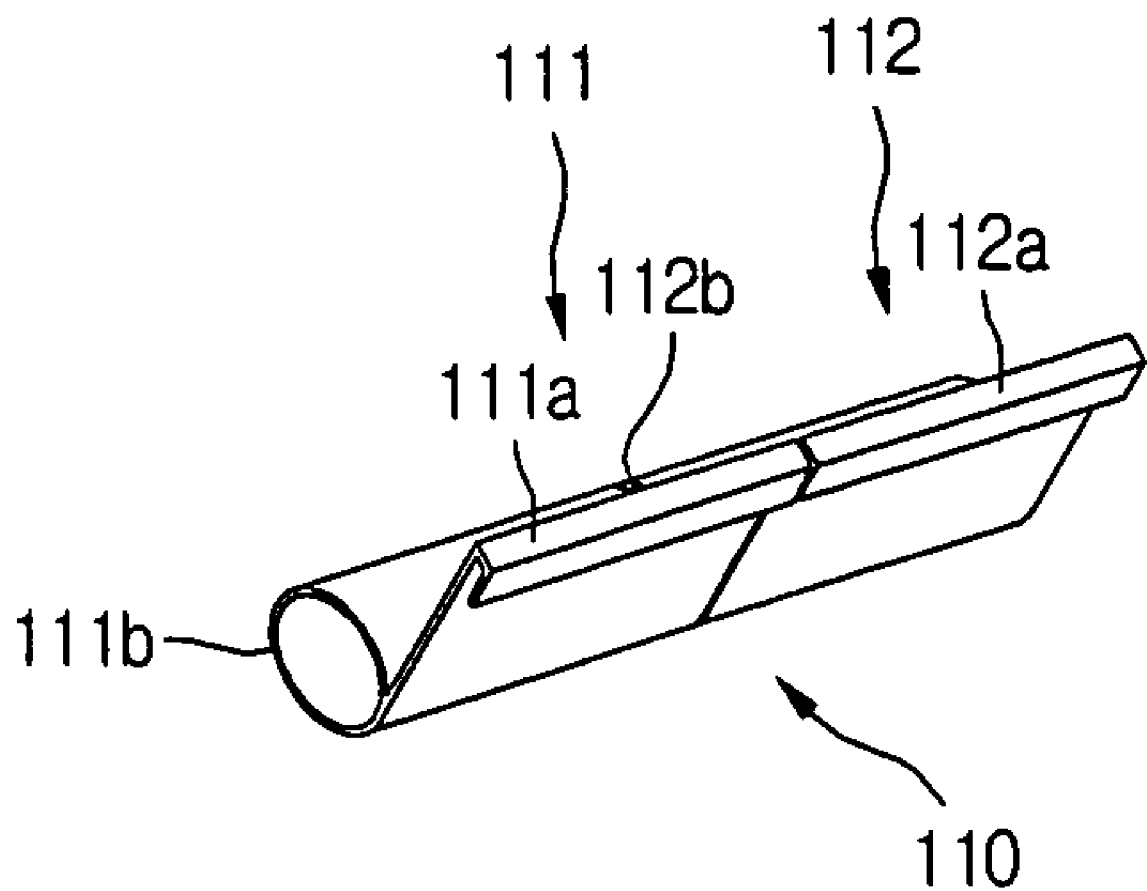
FIG. 5 is a perspective view of a plate spring that is installed inside the slide housing in FIG. 4.

FIG. 4 is cutaway perspective view of a slide housing for illustrating a stand for a display device according to an embodiment of the present invention, and FIG. 5 is a perspective view of a plate spring that is installed inside the slide housing.

Referring to FIGS. 4 and 5, a slide housing 10 according to one embodiment of the present invention is formed in a multi-sided, hollow column. A guiding member 101 for guiding the guided unit 20 is formed along the vertical length within the slide housing 10.

Retaining ridges 103a and 103b are formed to protrude from the top inner surface on either side of the slide housing 10, to prevent the guided unit 20 sliding along the guiding member 101 from detaching from the slide housing 10.

An elastic member holder 102 is provided at a predetermined location within the slide housing 10 for fixing an end of a plate spring 110 thereon. The plate spring 110, shown in detail in FIG. 5, expands or contracts by means of the guided unit 20, and elastically supports the guided unit 20. The plate spring 110 fixed on the elastic member holder 102 may be provided as two plate springs 111 and 112, as in one embodiment of the present invention, or as a single plate spring. Of course, not only can a plate spring be used, but any other elastic member that can provide both elasticity and friction to the guided unit 20 may also be used.

Each plate spring 111 and 112 is respectively hooked and fastened to an elastic member holder 102 at a fixed portion 111a and 112a thereof, and has an elastic portion 111b and 112b that is formed in a spiral spring shape that winds and unwinds according to the movement of the guided unit 20 moving along the guiding member 101 within the slide housing 10. Specifically, in the above-described structure, the elastic portions 111b and 112b unwind and impart elasticity when the plate springs 111 and 112 are pressed by the guided unit 20.

The fixed portions 111a and 112a of the plate springs 111 and 112 are fixed to the elastic member holders 102 in the slide housing 10, and the elastic portions 111b and 112b expand and contract according to the movement of the guided unit 20 along the guiding member 101.

The plate springs 111 and 112, that are the elastic members used in the present invention, are wound as a spiral spring type that maintain a uniform elasticity when pressed along a lengthwise direction. The fixed portions 111a and 112a of the plate springs 111 and 112 having the above characteristics are fixed on the elastic member holders 102 formed on the inside of the slide housing 10, and the elastic portions 111b and 112b thereof extend along the guiding member 101 formed perpendicularly on the inner surface of the slide housing 10 between the two sides thereof. The load of the display device is supported by the extending plate springs 111 and 112, which maintain the same elastic pressure regardless of their extended length and support the display at any adjusted height.

In one embodiment, the guided unit 20 is formed in a hexahedral shape with a surface that is cylindrically concaved to contact the outer surface of the elastic portions 111b and 112b of the cylindrically coiling plate springs 111 and 112.

A guide fixing bracket 332 of the hinge connecting unit 30 is fastened and fixed to the top surface 220 of the guided unit 20, and the display device is moved upward and downward to adjust its height depending on the movement of the guided unit 20.

When the guided unit 20 is guided vertically by the guiding member 101 on the inside of the slide housing 100, the bottom of the guided unit 20 acts as a pusher to extend the plate spring 110 disposed therebelow.

The operation of the above-described slide housing 10 and guided unit 20 proceeds as follows.

When a user wishes to move the display device 1 in a downward direction, the user can grasp and pull or push the display device 1 downward. Here, the force exerted to push or pull the display device 1 downward is transferred to the guided unit 20 coupled through a hinge to the bottom end of the hinge connecting unit 30 that is connected to the display device 1. When the force transferred to the guided unit 20 exceeds the elastic force of the elastic members 111b and 112b, the elastic members 111b and 112b that are wound like a spiral spring are unraveled, allowing the guided unit 20 to move downward along the guiding member 101 formed on the inner surface of the slide housing 10. When the user wishes to move the display device 1 in an upward direction, the user may grasp and move the display device 1 upward. Here, when the force transferred to the guided unit 20 exceeds the frictional force between the guided unit 20 and the guiding member 101 as well as the combined frictional force between the adjoining components, the guided unit 20 moves upward along the vertically formed guiding member 101 within the slide housing 10 with respect to the surface on which the display device is placed. Here, the elastic portions 111b and 112b are re-coiled and raised by their elasticity.

The vertical movement of the above-described guided unit 20 along the guiding member 101 formed vertically within the slide housing 10 allows the display device to be moved vertically.

Here, when the force exerted on the display device 1 is removed, the guided unit 20 stops moving. Thus, the expanding or contracting of the plate spring 110 also ceases. At the position where the plate spring 110 stops expanding or contracting, the elasticity in the plate spring 110 supports the load of the display device 1 so that the plate spring 110 stops moving. The display device 1 may be moved vertically due to the mechanism described above.

During the moving of the guided unit 20, due to the formation of the retaining ridges 103a and 103b on the slide housing 10, the guided unit 20 is prevented from moving further upwards by the retaining ridges 103a and 103b. Thus, the retaining ridges 103a and 103b restrict adjustment of the display device 1 in an upward direction within the slide housing 10. Accordingly, it is possible to elevate the display device 1 to as far as the lengths of the guiding member 101 and the plate spring 110 and the position of the retaining ridges 103a and 103b allow.

The above description explains exactly how the display device 1 is moved upward and downward, and a detailed description of the hinge connecting unit 30 of the display device and the rear fixing unit 40 is set forth below.

Figure 6:
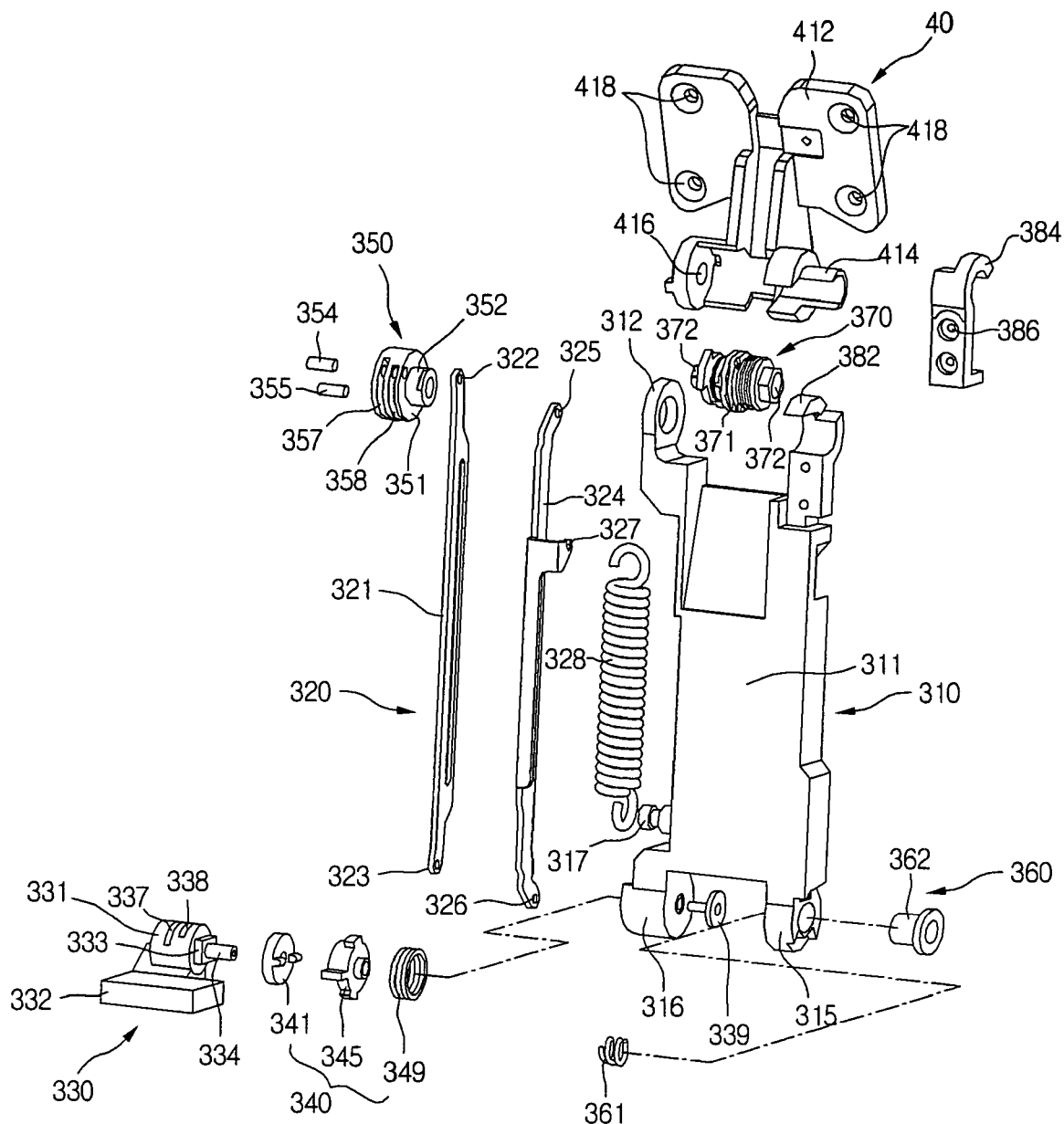
FIG. 6 is an exploded perspective view of a hinge connecting unit and a rear fixing unit of a stand for a display device according to the present invention.

FIG. 6 is an exploded perspective view of a hinge connecting unit and a rear fixing unit of a stand for a display device according to the present invention.

First, a hinge connecting unit 30 of a stand for a display device according to the present invention is coupled via a hinge at its lower end to the guided unit 20 that moves vertically inside the slide housing 10, and is coupled via a hinge at its upper end to the rear fixing unit 40 that is attached to a predetermined region of and supports the monitor of the display device 1. The rear fixing unit 40 is fixed to the rear surface 2 of the display device 1 to support the display device 1.

Referring to FIG. 6, the lower part of the hinge connecting unit 30 is connected to the guided unit 20 through the guide fixing bracket 332, and its upper part is connected to the rear fixing unit 40.

To briefly describe the structure of the hinge connecting unit 30, a link is pivotably coupled to the rear fixing unit 40 by means of a link hinge portion, and the link is pivotably coupled to the guided unit 20 through hinge coupling by means of guide hinge portion.

In further detail, the link includes a main link 310 pivotably connected at one end to the rear fixing unit 40 and pivotably connected at the other end to the guided unit 20 through the guide fixing bracket 332, a auxiliary link 320 disposed eccentrically to a pivoting center of the top of the main link 310 and pivotably connected to the guided unit 20 to move in unison with the main link 310 by means of the rear fixing unit 40 and the guide fixing bracket 332, and an elastic member 328 with one end fixed to the main link 310 and the other end fixed to the auxiliary link 320.

The guide hinge portion includes a first and a second guide hinge portion 360 and 330 hinge-coupled to the guide fixing bracket 332 coupled to the guided unit 20, and a stopper 340 for sustaining an upright position of the main link 310 when the main link 310 is raised upright.

Even more specifically, the rear fixing unit 40 is pivotably connected to the main link 310 by means of the link hinge portion including the first and second link hinge portions 350 and 370. Also, the main link 310 is pivotably connected to the guide fixing bracket 332 fixed to the guided unit 20 by means of the guide hinge portion including the first and second guide hinge portions 360 and 330.

Both ends of the auxiliary link 320 are respectively installed on the second link hinge portion 350 and the first auxiliary link hinge portion located on the second guide hinge portion 330. At the inner side of the auxiliary link 320, one end of the spring 328 is connected to the main link 310, and the other end is connected to the side of the auxiliary link 320.

A stopper 340 is installed on the second guide hinge portion 330 to sustain the main link 310 in a straight disposition when the main link 310 is straightened. A detailed description of the structure and operation of the stopper 340 will be given below.

A description of the schematic structure of the hinge connecting unit 30 has been given above, whereupon a more detailed structural description thereof will be given below.

The rear fixing unit 40 includes a monitor supporting plate 412 fixed to the rear surface of the display device 1. The monitor supporting plate 412 defines a plurality of coupling holes 418 for coupling to the rear of the display device 1. Screws or other fasteners insert through the coupling holes 418 to fasten the monitor supporting plate 412 to the rear of the display device 1.

A first hinge shaft 414 for forming the first link hinge portion 370 with the main link 310, and a second hinge hole 416 for inserting a second link hinge shaft 372 is formed below the supporting plate 412. The first hinge shaft 414 is mounted inside the first hinge receiving portion 382 of the main link 310. By coupling the first hinge coupling member 384 to the first hinge receiving portion 382, the supporting plate 412 can pivot with respect to the main link 310.

The first link hinge portion 370 is installed within the second hinge hole 416. The first link hinge portion 370 has a second hinge spring 371 for tilting the rear fixing unit 40, and a second hinge shaft 372 forming the hinge shaft for the second link hinge portion 350, mounted thereon. One end of the second hinge shaft 372 couples with the second link supporting shaft 352 that passes through the second hinge shaft receiving portion 312 formed on one end at the top of the main link 310 and extending from the inner surface of the second auxiliary link supporting portion 351.

The second auxiliary link supporting portion 351 has second auxiliary link receiving portions 357 and 358 formed therein for receiving respective ends of the two auxiliary links 321 and 324 installed beside the main link 310. The two auxiliary links 321 and 324 may be parallel to one another. The points supporting the respective ends of the two auxiliary links 321 and 324 are offset from the pivoting center of the main link 310 by a predetermined distance. The ends of the two auxiliary links 321 and 324 are pivotably fixed to the second auxiliary link supporting portion 351 by second auxiliary link fixing shafts 354 and 355. The two other ends of the two auxiliary links 321 and 324 have through holes 323 and 326 formed therein. The two auxiliary links 321 and 324 are connected to a first auxiliary link supporting portion 331 through the through holes 323 and 326.

First auxiliary link receiving portions 337 and 338 are formed in the first auxiliary link supporting portion 331 to receive the two auxiliary links 321 and 324. The other end portions of the two auxiliary links 321 and 324 are fastened in the first auxiliary link receiving portions 337 and 338 by first auxiliary link fastening shafts 335 and 336. The second guide hinge portion 330 is positioned under the first auxiliary link receiving portions 337 and 338 in order to fix the main link 310 via a hinge to the guide fixing bracket 332 fixed to the guided unit 20. The stopper 340 is formed to the side of the second guide hinge portion 330, in order to stop the pivoting movement of the main link 310 when the main link 310 is straightened. A description of the stopper 340 will be provided in detail below.

As described, the auxiliary links 321 and 324 are fixed to the first auxiliary link supporting portion 331 and the second auxiliary link supporting portion 351 in mutually different off-centered positions. Thus, the auxiliary links 321 and 324 and the auxiliary link supporting portions 331 and 351 collectively form a four bar link, namely quadric crank mechanism, that provides the conventional functions of a four bar link. For example, when the second auxiliary link supporting portion 351 is moved while the first auxiliary link supporting portion 331 is stationary, the movement of the auxiliary links 321 and 324 causes the angle of the second auxiliary link supporting portion 351 to remain the same as that of the first auxiliary link supporting portion 331. To explain this in visual terms, if the display device 1 is moved using a force less than a predetermined force, the tilt angle of the display device 1 remains fixed and only its height is altered by means of the first auxiliary link supporting portion 331. This allows a user to retain a desired tilt angle of the display device 1 while moving it in other ways. However, when the predetermined level of force is exceeded in moving the display device 1, the hinge on the upper portion of the hinge connecting unit 30 pivots so that the display device 1 rotates and changes its tilt angle.

The elastic member 328 is installed to the inside of the first auxiliary link 324 that is the closer of the two auxiliary links 321 and 324 to the main link 310. The elastic member 328 has one end fixed on a second elastic member supporting protrusion 327 formed at the upper, inner portion of the first auxiliary link 324, and the other end of the elastic member 328 is fixed on a first elastic member supporting protrusion 317 formed on a lower side portion of the main link 310. The elastic member 328 maintains the auxiliary links 321 and 324 at a predetermined position with respect to one another, so that the auxiliary links move at a predetermined position. Therefore, when a user moves the display device 1 upward, only a small force can be used to move the display device 1.

A first guide hinge receiving portion 315 and a second guide hinge receiving portion 316 are formed at the lower end of the main link 310, in order to pivotably connect the main link 310 to the guide fixing bracket 332 fixed to the guided unit 20. The first guide hinge portion 360 includes a first base hinge shaft 339 received in the first guide hinge receiving portion 315 of the main link 310 and a coil spring 349. Here, the first base hinge shaft 362 passes successively through the first guide hinge receiving portion 315 and the coil spring 349, and is fastened.

Figure 7:
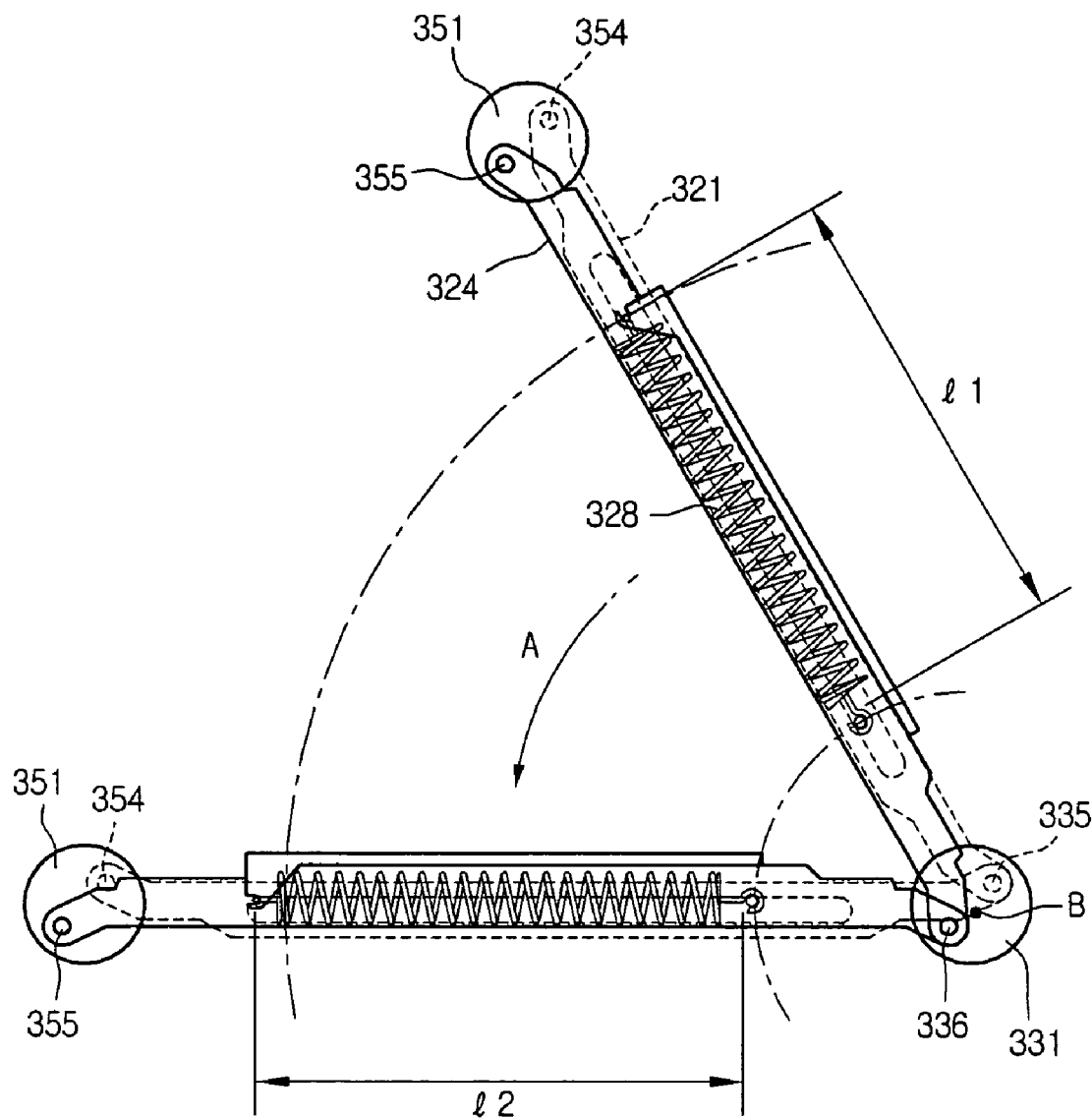
FIG. 7 is a side view showing the operation of a main spring of a stand for a display device according to the present invention.

FIG. 7 is a side view showing the operation of a main spring of a stand for a display device according to the present invention.

Referring to FIG. 7, when the display device is in an upright position on the stand, the elastic member 328 retains its original shape. Here, the elastic member retains its minimum length (l1), where its elasticity is also at its minimum.

In order to adjust the display device to a height and tilt angle desired by a user, when force is applied in a downward direction on the display device 1, as shown in FIG. 7, the link hinge portions 350 and 370 pivot, and the main link 310 pivots in the direction as shown by arrow (A). The two auxiliary links 321 and 324 move according to the movement of the main link 310.

Here, when the main link 310 pivots, one end of the elastic member 328 fixed to an end of the main link 310 retains the same distance from pivoting point (B). However, the two auxiliary links 321 and 324 are not co-centric with pivoting point (B) of the main link 310, so that the other end of the elastic member 328 fixed to an end of the first auxiliary link 324 moves further away from pivoting point (B) of the main link 310. Accordingly, the elastic member 328 expands and imparts elasticity. Thus, the elasticity of the elastic member 328 imparts a restricting force on the pivoting motion of the main link 310. When the display device is positioned at a certain point, and the user no longer exerts force thereon, the weight of the display device 1 and the elasticity of the elastic member 328 combine to establish equilibrium, whereupon the display device 1 is fixed in that position. Of course, friction forces between each parts can be activated as a origin to stop the movement of the display device.

Moreover, if a user exerts continued pressure on the display device in order to fold it so that the main link 310 is in a completely folded position (i.e., when the main link 310 becomes parallel to the horizontal surface), the elastic member 328 attains a maximum length (l2) and also a maximum level of elasticity.

When the main link 310 is completely erected, the stopper 340 according to the present invention automatically locks to maintain the main link 310 in the upright position. Thus, the user can easily push the hinge connecting unit 30 into the slide housing 10. The locking of the main link 310 by the stopper 340 will be described below in more detail.

When the folding of the main link 310 is cancelled, the elasticity from the elastic member 328 returns the main link 310 to an upright position. Here, the end of the elastic member 328 that extended, moves closer to the pivoting center (B) of the main link 310. This is because the other end of the elastic member 328 is fixed to an end of the main link 310.

In this way, the elastic member 328 expands and contracts only at one of its ends—i.e., the end fixed to the auxiliary link. Thus, when compared to the conventional spring that was connected on either end of a link, the elastic member 328 according to the present invention achieves the same position with a reduced amount of stretching.

Figure 8:
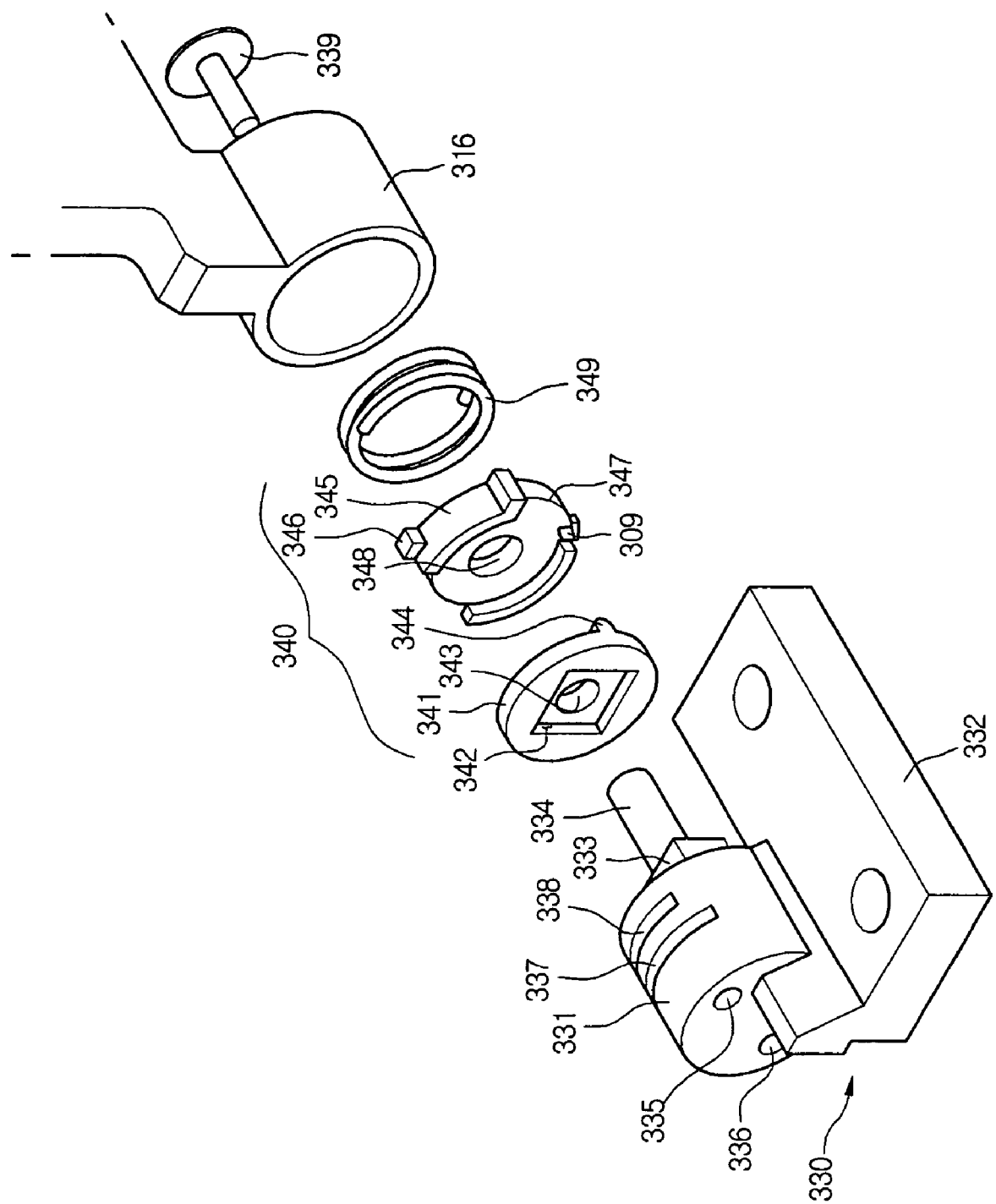
FIG. 8 is an exploded perspective view of a stopper of a stand for a display device according to the present invention.
Figure 9:
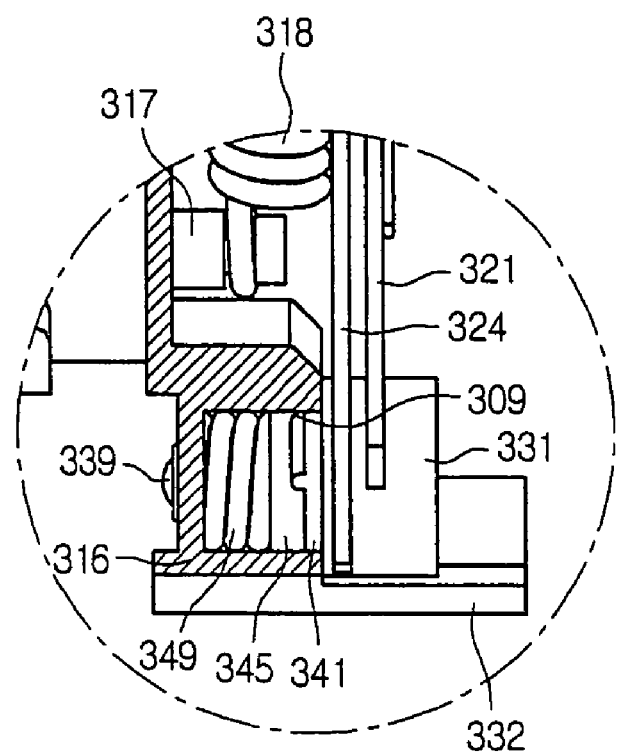
FIG. 9 is a frontal view showing an assembled stopper of a stand for a display device according to the present invention.

FIG. 8 is an exploded perspective view of a stopper of a stand for a display device according to the present invention, and FIG. 9 is a frontal view showing an assembled stopper of a stand for a display device according to the present invention.

As described above, the stopper 340 according to the present invention is a structure that automatically fixes the position of the main link 310 when the stand is erected. Referring to FIGS. 8 and 9, the structure of the stopper 340 will now be explained.

Referring to FIG. 8, the stopper 340 according to the present invention has a latch 341 and a rotating member 345. The latch 341 and the rotating member 345 are located on the side wall of the first auxiliary link supporting portion 331 and insert inside the second guide hinge receiving portion 316.

In further detail, the second base hinge shaft 339 is inserted through the opposite side of the second guide hinge receiving portion 316 and sequentially inserted through the coil spring 349, the rotating member 345, and the latch 341, and inserts into the second guide hinge shaft receiving portion 334.

More specifically, a latch fixing portion 333 and the second guide hinge shaft receiving portion 334 protrude from a side of the first auxiliary link fixing shafts. The second guide hinge shaft receiving portion 334 inserts into a latch shaft receiving portion 343 in the latch 341. A fixing recess 342 is formed in a surface of the latch 341. The fixing recess 342 inserts over the latch fixing portion 333, the latch 341 inserts over the second guide hinge shaft receiving portion 334, and to the guided unit 20 through the second guide fixing bracket 332.

A protruding portion 344 is formed on the other side of the latch 341 (the side from which the second guide hinge shaft receiving portion 334 protrudes through). The protruding portion 344 may be formed on the peripheral region of the latch 341.

As a component facing the latch 341, the rotating member 345 rotates in unison with the main link 310. A rotating member shaft receiving portion 348 is formed in the center of the rotating member 345. The rotating member shaft receiving portion 348 is rotatively inserted and installed0020over the second guide hinge shaft receiving portion 334. The rotating member 345 contacts the latch 341 on at least one side thereof. A protrusion 346 is formed on the periphery of the rotating member 345. The protrusion 346 is fixed within the second guide hinge receiving portion 316. Accordingly, the rotating member 345 rotates when the main link 310 rotates.

A radially cut portion 347 is formed on a surface of the rotating member 345 that the latch 341 contacts, so that when the rotating member 345 rotates, the protruding portion 344 of the latch 341 can move therein. The radially cut portion 347 is an extended recess cut in a radial direction along a surface of the rotating member 345 in a depth equal to the height of the protruding portion 344 of the latch 341.

Referring to FIG. 9, one end of the radially cut portion 347 is formed to contact the protruding portion 344 of the latch 341 when the main link 310 is horizontally disposed. A ledge 309 is formed at the lower end of the radially cut portion 347.

The ledge 309 acts as a stopper for the protruding portion 344 of the latch 341 when the rotating member 345 rotates against the latch 341. A more detailed explanation thereof will be provided.

Figure 10:
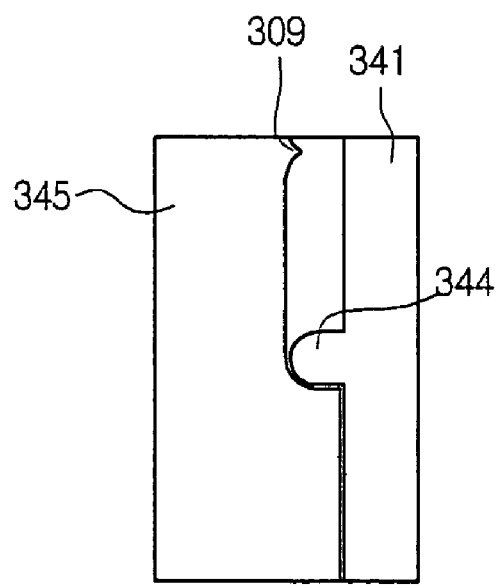
FIG. 10 is a diagram showing the respective positions of a latch and a rotating body when a stand for a display device according to the present invention is upright.
Figure 11:
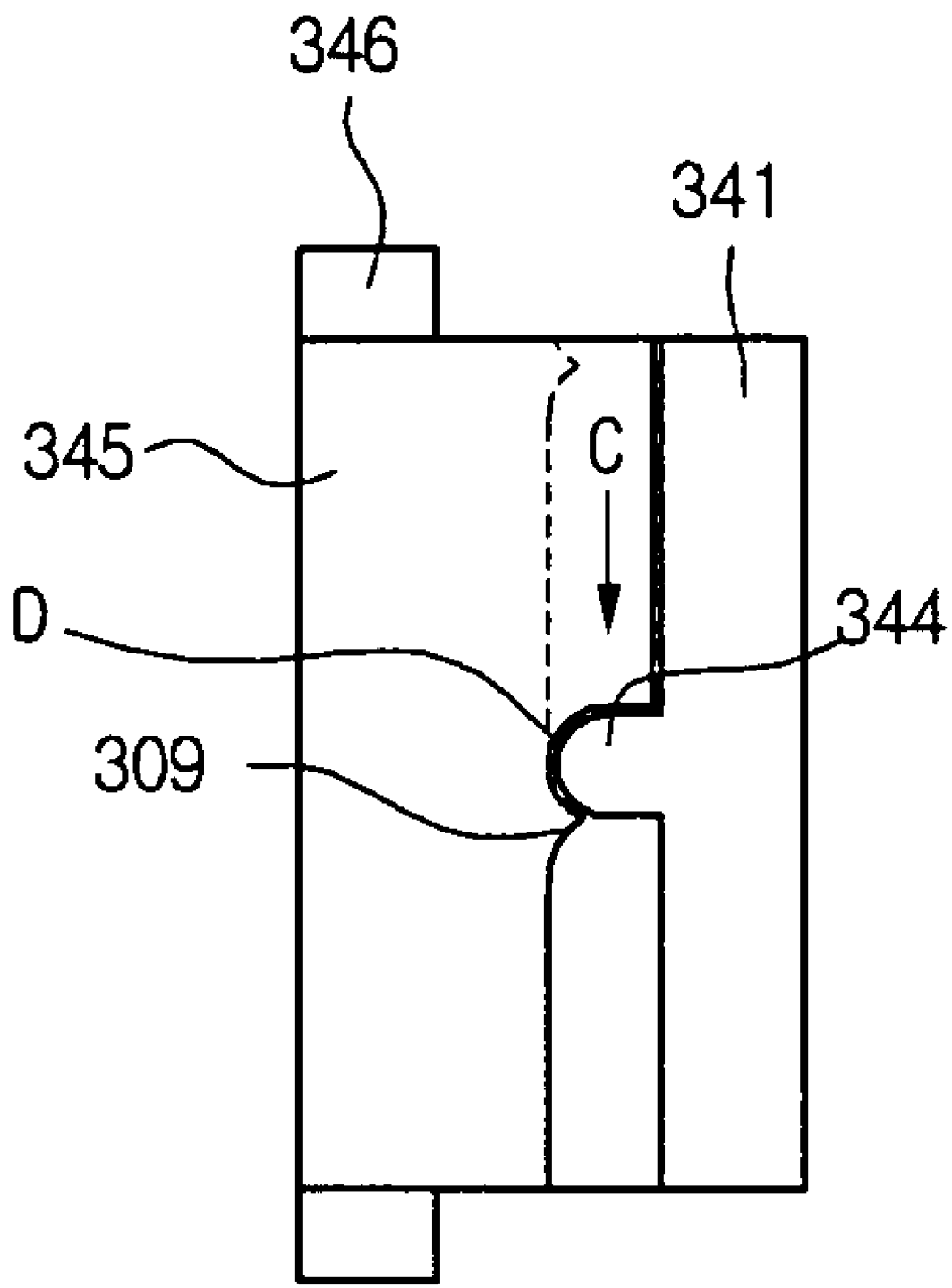
FIG. 11 is a diagram showing the respective positions of a latch and a rotating body when a stand for a display device according to the present invention is folded.

FIG. 10 is a diagram showing the respective positions of a latch and a rotating body when a stand for a display device according to the present invention is upright, and FIG. 11 is a diagram showing the respective positions of a latch and a rotating body when a stand for a display device according to the present invention is folded.

Referring to FIGS. 10 and 11, when the stand of the display device according to the present invention is in a horizontal position, the protruding portion 344 of the latch 341 contacts an inner surface of the radially cut portion 347 of the rotating member 345. Here, when the main link 310 is pivoted to an upright position, the rotating member 345 rotates in the direction shown by the arrow (C) in unison with the main link 310.

According to the rotation of the rotating member 345, the radially cut portion 347 of the rotating member 345 moves past the protruding portion 344 of the latch 341. As the radially cut portion 347 moves past the protruding portion 344, the ledge 309 formed on a lower end of the radially cut portion 347 contacts the protruding portion 344. The ledge 309 may be designed to require a predetermined force to be exerted in order to move past the protruding portion 344.

When a force required moving the ledge 309 past the protruding portion 344 is exerted, the main link 310 is completely locked. Here, as shown in FIG. 11, when the protruding portion 344 formed on the latch 341 passes the ledge 309 of the rotating member 345, it rests in the resting groove (D) formed on a side of the radially cut portion 347 of the rotating member 345. The force of the ledge 309 supporting the protruding portion 344 of the latch 341 may be designed to be greater than the elastic force that the elastic member 328 installed on the auxiliary link imparts to straighten the main link 310 when folded.

As described above in the above operation, the main link 310, according to the present invention, is stopped in its pivoting and fixed by the stopper 340 located at the bottom of the main link 310. In this way, the main link 310 is locked when it is extended. Accordingly, a user can not only know the exact position of a completely extended hinge connecting unit 30, but the extended position is reliably secured as well. Subsequently, the hinge connecting unit 30 can conveniently be inserted into the slide housing 10.

In the above structure, a user can easily perform the extending of the hinge connecting unit 30, as well as the inserting of the hinge connecting unit 30 back into the slide housing 20 from an extended position. Thus, an excessive rearward bending of the hinge connecting unit 30 may be prevented.

In the following, a separate description of each controlling mode of the display device 1 using the stand thereof will be provided.

Figure 12:
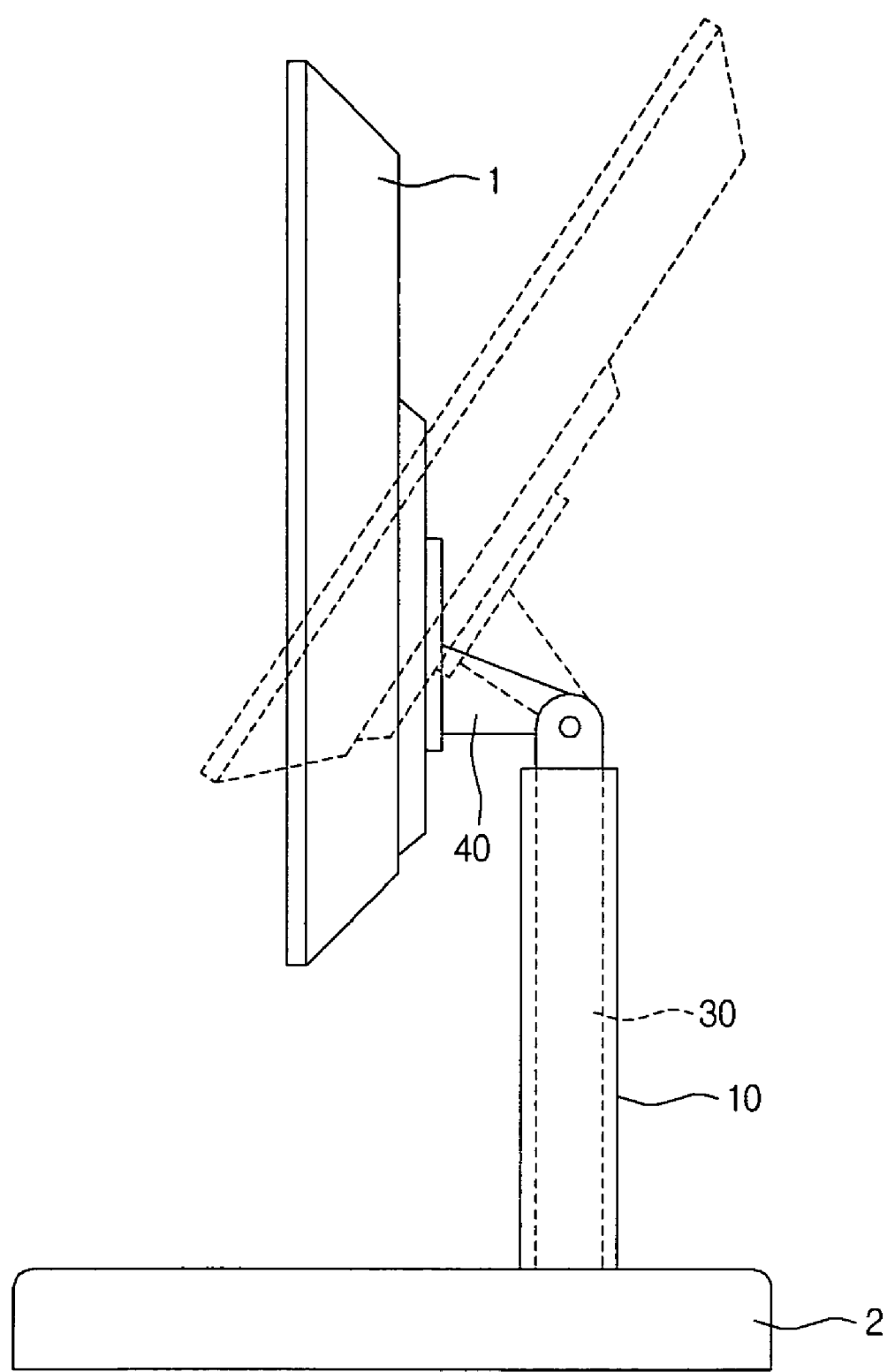
FIG. 12 is a side view of a stand for a display device according to the present invention showing a hinge connecting unit inserted completely in a slide housing, where the display device is pivoted in its entirety.

FIG. 12 is a side view of a stand for a display device according to the present invention showing a hinge connecting unit inserted completely in the slide housing, where the display device is pivoted in its entirety.

Referring to FIG. 12, the hinge connecting unit 30 is inserted in the slide housing 10 so that the lower portion of the hinge connecting unit 30 cannot be moved on its hinge, and only the upper portion thereof may be pivoted on its hinge. Thus, the hinge between the rear fixing unit 40 and the hinge connecting unit 30 may be pivoted.

FIG. 12 includes dotted lines showing the pivoting movement of the display device 1. This is a mode in which a user does not wish to alter the height of the display device 1, but may easily alter only its tilt angle thereof.

Figure 13:
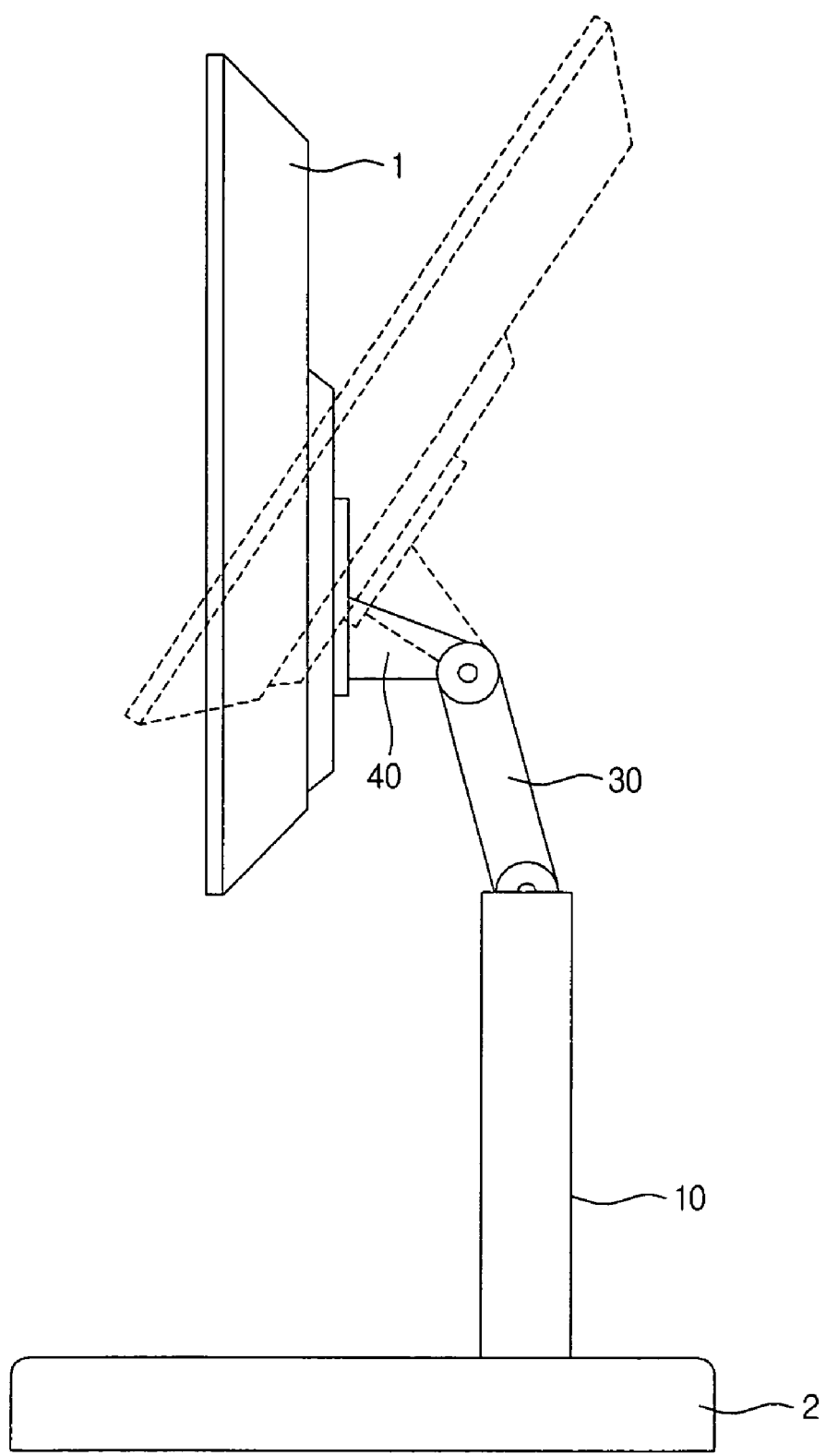
FIG. 13 is a side view of a stand for a display device according to the present invention showing a hinge connecting unit extruded from a slide housing, where the display device is pivoted in its entirety without using the a bar connection.
Figure 14:
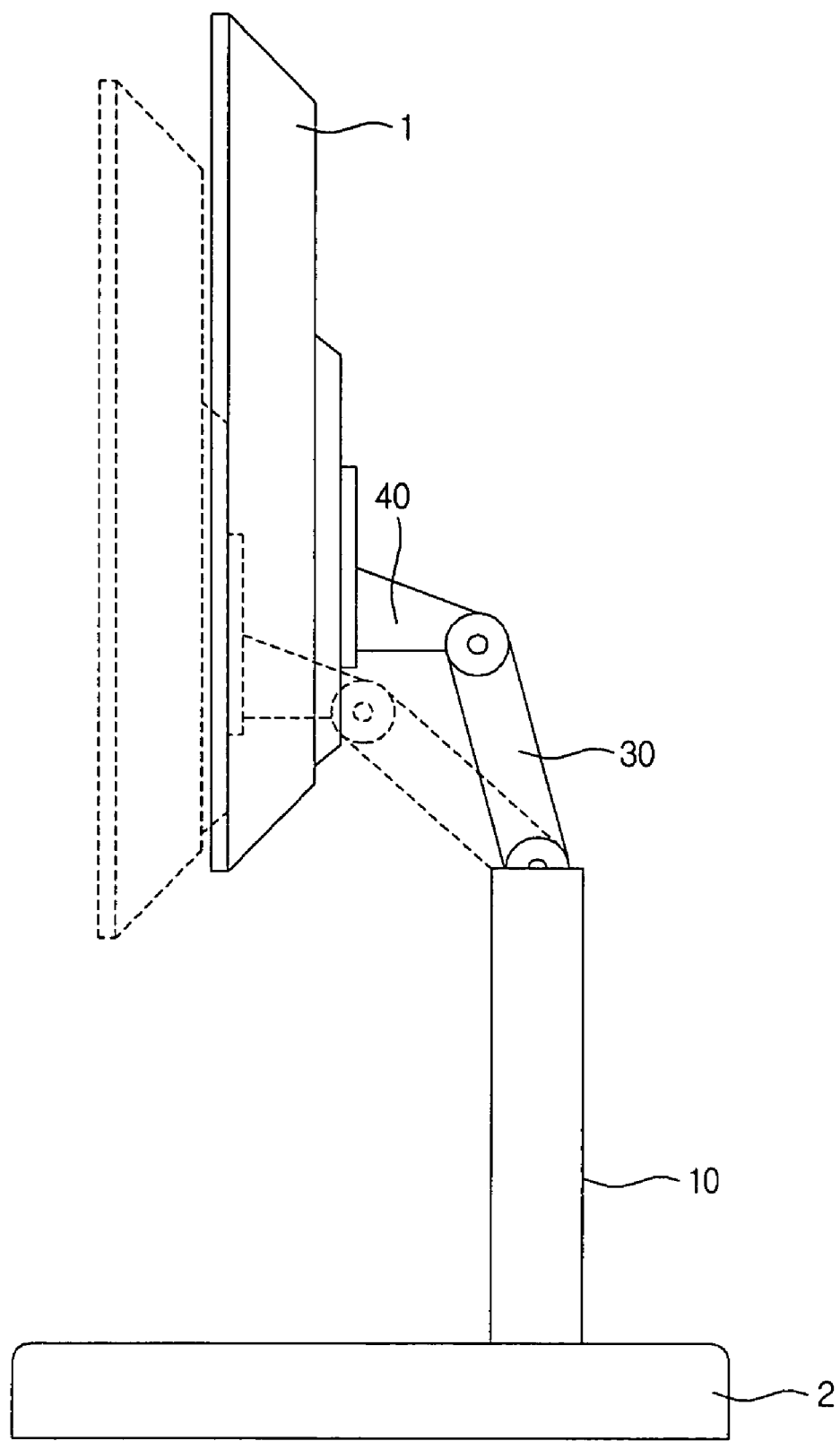
FIG. 14 is a side view of a stand for a display device according to the present invention showing a hinge connecting unit extruded from a slide housing, where the display device is adjusted using a four bar connection through the supporting link formed on the hinge connecting unit.

FIG. 13 is a side view of a stand for a display device according to the present invention showing a hinge connecting unit extruded from a slide housing, where the display device is pivoted in its entirety without using the a bar connection, and FIG. 14 is a side view of a stand for a display device according to the present invention showing a hinge connecting unit extruded from a slide housing, where the display device is adjusted using a four bar connection through the supporting link formed on the hinge connecting unit.

Referring to FIG. 13, when a user exerts a predetermined amount of force—specifically, a force in a direction for pivoting the hinge at the connecting portion of the hinge connecting unit and the rear fixing unit—the display device 1 may be tilted. This mode is suitable for adjusting the tilt angle of the display device 1 while it is in an elevated position.

Referring to FIG. 14, when a user exerts a predetermined amount of force—specifically, a force in a direction for using the four bar link—the tilt angle of the display device 1 is maintained, while the operation of the four bar link allows the height of the display device and its distance from the user to be adjusted. This mode is suitable for being able to conveniently adjust the height of the display device and its distance from the user without altering its tilt angle.

The modes depicted in FIGS. 13 and 14 are concurrently possible, so that a user may easily position the display device to fit his/her wishes. This mode provides the most convenience for a user.

Of course, the display device may be adjusted by using the hinge at the lower portion of the hinge connecting unit as well.

The hinge connecting unit of the stand for the display device according to the present invention is guided by the slide housing to move up and down, so that a user can freely adjust the height of the screen to a desired level. Furthermore, when the hinge connecting unit is extruded from the slide housing, the position of the display device may be adjusted in multiple ways to satisfy the user's preferences.

In addition, the height of the display device, its tilt angle, and its distance from a user can be simultaneously adjusted.

Furthermore, through a simple structural change in the mechanism, a user's satisfaction at the improved level of convenience, along with an inexpensive manufacturing cost can both be realized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for a display device comprising:
a base;
a slide housing fixed to the base at an end thereof and extending upward from the base;
a hinge connecting unit guided to move along an extending direction of the slide housing;
first and second hinge units disposed below the hinge connecting unit and a connecting position of an upper end of the hinge connecting unit respectively, and the second hinge unit is disposed for allowing the hinge connecting unit and the display device to pivot, and
a guided unit connected to the second hinge unit, and configured to be movable within the slide housing,
wherein the first hinge unit is disposed slidably with respect to the slide housing, and the hinge connecting unit has a link comprising a first end on which the first hinge unit is provided, and a second end on which the second hinge unit is provided, and the second hinge unit has a stopper for stopping a pivoting of the link.

2. The stand according to claim 1, wherein the slide housing is vertically fixed to the base.

3. The stand according to claim 1, wherein the slide housing includes a retaining ridge formed thereon for preventing the hinge connecting unit from detaching from the slide housing.

4. The stand according to claim 1, wherein the slide housing includes a guiding member formed in the extending direction of the slide housing for guiding the hinge connecting unit.

5. The stand according to claim 1, wherein the slide housing includes an expanding and contracting elastic member that is pressed upon by the hinge connecting unit.

6. The stand according to claim 1, wherein the hinge connecting unit is inserted and guided inside the slide housing.

7. The stand according to claim 1, further comprising:
a plate spring for imparting an elastic force on the guided unit when the guided unit presses against and expands the plate spring.

8. The stand according to claim 7, wherein the plate spring includes a fixed portion fixed on a predetermined inner surface of the slide housing, and an elastic portion having elasticity and extending from the fixed portion and wound in a shape of a spiral spring.

9. The stand according to claim 7, wherein two separate plate springs are provided.

10. The stand according to claim 1, wherein the hinge connecting unit includes a pair of auxiliary links connected to the hinge units, the auxiliary links acting as a four bar link in conjunction with the hinge units.

11. The stand according to claim 1, wherein the first hinge unit is configured to be selectively extruded from the slide housing, or to be inserted in from the slide housing.

12. The stand according to claim 1, wherein the stopper comprises:
- a latch fixed to the guided unit, the latch having a protruding portion formed on a peripheral region of the latch; and
- a rotation member configured to be rotatable along with the pivoting of the link with respect to the latch, the rotation member having a radially cut portion formed on a surface of the rotation member that the latch contacts, so that when the rotation member rotates, the protruding portion selectively is able to move therein.

13. The stand according to claim 1, wherein the guided unit is formed in a hexahedral shape, and has a top surface to which the second hinge unit is coupled, and a bottom surface to which a plate spring provides an elastic force to the guided unit,
- wherein the plate spring is a cylindrically coiling plate spring, and has one end that is fixed to the slide housing,
- wherein the bottom surface is formed in a cylindrically concaved shape for contacting an outer surface of a cylindrically coiling portion of the plate spring.

14. A stand for a display device comprising:
- a base;
- a slide housing fixed to the base at an end thereof and extending from the base;
- a hinge connecting unit guided to move along an extending direction of the slide housing and including first and second hinge units on either end thereof;
- a guided unit fixed to a lower end of the hinge connecting unit;
- a plate spring disposed inside the slide housing for being pressed upon by the guided unit and being expandable; and
- a rear fixing unit fixed between an upper end of the hinge connecting unit and a rear of the display device,
- wherein the first hinge unit is configured to be slidable with respect to the slide housing,
- wherein the hinge connecting unit further includes:
  - a link
  - a link hinge unit for coupling the rear fixing unit and the link through a hinge, and
  - a guide hinge unit for coupling the link and the guided unit through a hinge, the guide hinge unit having a stopper for stopping a pivoting of the link.

15. The stand according to claim 14, wherein the link includes:
- a main link with one end thereof pivotably connected to the rear fixing unit and another end thereof pivotably connected to the guided unit;
- an auxiliary link connected between the rear fixing unit and the guided unit to one side of the main link, to pivot together with the main link from a position offset from a pivoting center of the main link; and
- an elastic member with one end thereof fixed to the main link and another end thereof fixed to the auxiliary link.

16. The stand according to claim 14, wherein the guide hinge unit includes:
- a first guide hinge unit and a second guide hinge unit for coupling the link and the guided unit through a hinge.

17. The stand according to claim 16, wherein the stopper operates when the link aligns with the extending direction of the slide housing.

* * * * *